United States Patent [19]

Shimabara et al.

[11] Patent Number: 5,294,164
[45] Date of Patent: Mar. 15, 1994

[54] INSTRUMENT PANEL MOUNTING STRUCTURE FOR AUTOMOBILE

[75] Inventors: Tetsuo Shimabara; Yoshikazu Kibayashi; Noriaki Igaki; Katsunari Ose; Hirotsugu Kondo, all of Hiroshima, Japan

[73] Assignee: Nishikawa Kasei Co., Ltd., Japan

[21] Appl. No.: 957,739

[22] Filed: Oct. 7, 1992

[30] Foreign Application Priority Data

Oct. 14, 1991 [JP] Japan .................. 3-264867

[51] Int. Cl.⁵ .................................. B62D 25/14
[52] U.S. Cl. .......................... 296/72; 24/293; 180/90
[58] Field of Search .............. 296/70, 72; 280/752; 180/90; 24/289, 293, 297

[56] References Cited

U.S. PATENT DOCUMENTS

| | | | |
|---|---|---|---|
| 4,570,991 | 2/1986 | Lystad | 296/97.8 |
| 4,723,792 | 2/1988 | Sakamoto et al. | 280/751 |
| 4,943,107 | 7/1990 | Rhodes, Jr. | 296/70 |
| 5,095,592 | 3/1992 | Doerfling | 24/293 |

Primary Examiner—David M. Mitchell
Assistant Examiner—Andrew C. Pike
Attorney, Agent, or Firm—Wegner, Cantor, Mueller & Player

[57] ABSTRACT

An instrument panel mounting structure for an automobile, characterized in that lower end portions of a pair of front pillar trims are forcibly flexed inwardly of a cabin of the automobile to come into contact with laterally opposite end portions of an instrument panel, respectively, thereby securely eliminating a gap between the lower end portion of each front pillar trim and the corresponding laterally opposite end portion of the instrument panel to improve an appearance. A pair of leaf springs are mounted to the laterally opposite end portions of the instrument panel, respectively. The lower end portions of the front pillar trims are biased inwardly of the cabin by the leaf springs so as to be urged against the laterally opposite end portions of the instrument panel, respectively.

4 Claims, 9 Drawing Sheets

INSTRUMENT PANEL MOUNTING STRUCTURE FOR AUTOMOBILE

BACKGROUND OF THE INVENTION

1. Field of the Invention

The present invention relates generally to an instrument panel mounting structure for an automobile, and more particularly to an improvement in joint portion between an instrument panel and a front pillar trim.

2. Description of the Prior Art

An instrument panel provided on a front side of a driver's seat in an automobile is mounted to a vehicle body of the automobile at a suitable position. A pair of front pillar trims are located at laterally opposite end portions of the instrument panel in such a manner that lower end portions of the front pillar trims are in contact with the laterally opposite end portions of the instrument panel, respectively. The front pillar trims are mounted to a pair of front pillar panels constituting the vehicle body, respectively.

However, there is a case that a lateral dimension of the vehicle body is fluctuated because of a manufacturing error. If the manufacturing error of the vehicle body becomes plus, that is, the lateral dimension of the vehicle body is enlarged, there is generated a gap between each laterally opposite end portion of the instrument panel and the lower end portion of the corresponding front pillar trim, thus deteriorating an appearance.

SUMMARY OF THE INVENTION

It is therefore an object of the present invention to provide an instrument panel mounting structure for an automobile which can eliminate the gap between each front pillar trim and the instrument panel due to the manufacturing error of the vehicle body.

In accordance with an aspect of the present invention, there is provided an instrument panel mounting structure for an automobile including a vehicle body having a pair of front pillar panels and a pair of front pillar trims mounted to said front pillar panels, respectively; said instrument panel mounting structure comprising an instrument panel mounted to said vehicle body; and a pair of biasing means mounted to laterally opposite end portions of said instrument panel, respectively, for biasing lower end portions of said front pillar trims inwardly of a cabin of said automobile and urging said lower end portions of said front pillar trims against said laterally opposite end portions of said instrument panel.

With this mounting structure, even when a manufacturing error in lateral dimension of the vehicle body becomes plus, the lower end portion of each front pillar trim is forcibly flexed inwardly of the cabin to thereby offset the above manufacturing error. Accordingly, the lower end portion of each front pillar trim is always urged against the corresponding laterally opposite end portion of the instrument panel by the corresponding biasing means irrespective of the manufacturing error. As a result, there is generated no gap between the lower end portion of each front pillar trim and the corresponding laterally opposite end portion of the instrument panel, thereby improving an appearance.

In accordance with another aspect of the present invention, there is provided an instrument panel mounting structure for an automobile including a vehicle body having a pair of front pillar panels and a pair of front pillar trims mounted to said front pillar panels, respectively; said instrument panel mounting structure comprising an instrument panel mounted to said vehicle body, said instrument panel being formed at its laterally opposite end portions with a pair of recesses opening upwardly, respectively; and a pair of pawls formed integrally with lower end portions of said front pillar trims, respectively, said lower end portions including said pawls being adapted to flexibly engage said recesses of said instrument panel, respectively; whereby said lower end portions including said pawls of said front pillar trims are press-fitted with said recesses of said instrument panel, respectively, thereby fixing said lower end portions of said front pillar trims to said instrument panel.

With this mounting structure, the lower end portion of each front pillar trim is press-fitted with the recess formed at the corresponding laterally opposite end portion of the instrument panel. Accordingly, even when a manufacturing error in lateral dimension of the vehicle body becomes plus, the lower end portion of each front pillar trim is forcibly urged inwardly of the cabin in each recess, so that there is no possibility that the lower end portion of each front pillar trim comes out of the recess. Thus, there is generated no gap between the instrument panel and each front pillar trim, thereby improving an appearance.

The above and other objects, features and advantages of the present invention and the manner of realizing them will become more apparent, and the invention itself will best be understood from a study of the following description and appended claims with reference to-the attached drawings showing some preferred embodiments of the invention.

DETAILED DESCRIPTION OF THE PREFERRED EMBODIMENTS

There will now be described in detail some preferred embodiments of the present invention with reference to the drawings.

Figure 1:
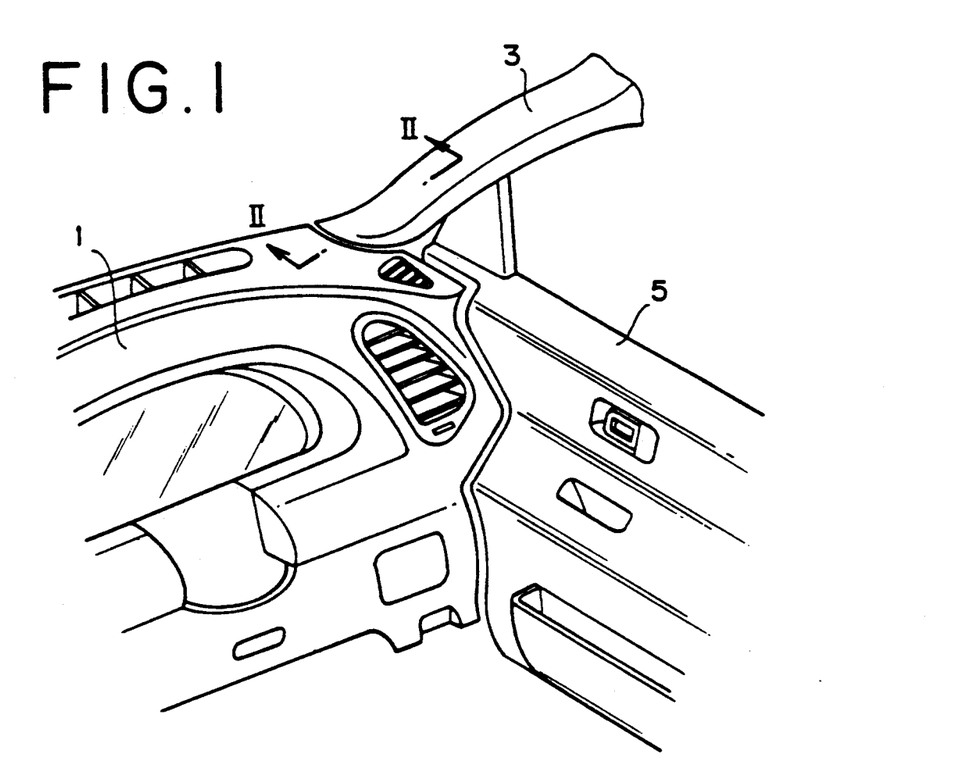
FIG. 1 is a schematic perspective view of the interior of a cabin of an automobile.
Figure 2:
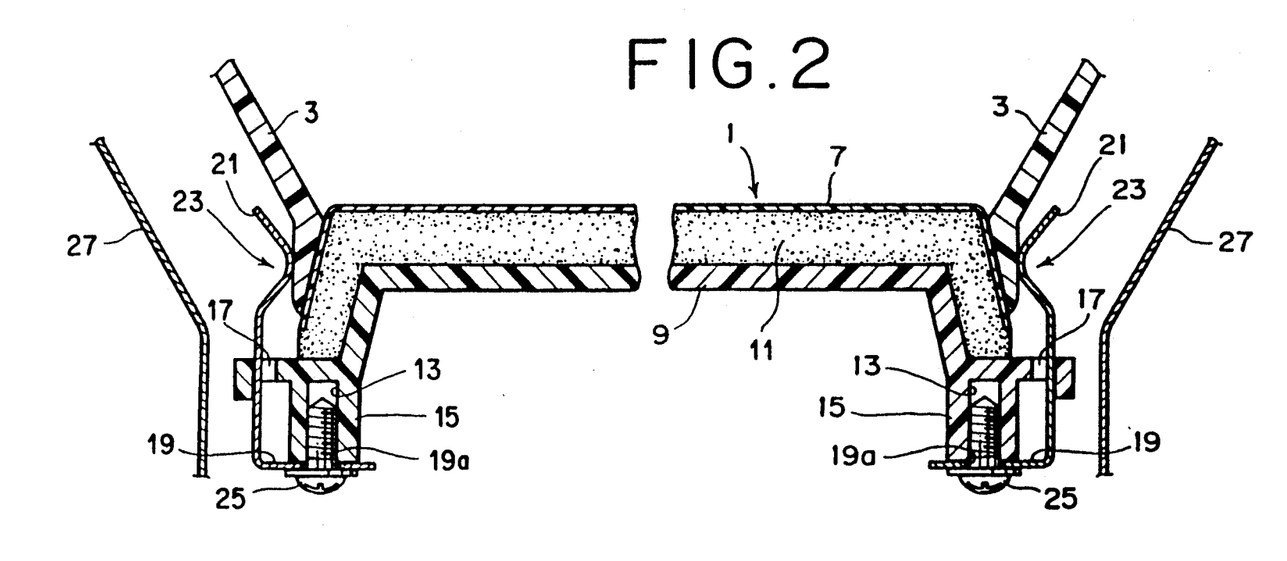
FIG. 2 is a cross section taken along the line II—II in FIG. 1, showing a first preferred embodiment of the present invention.
Figure 3:
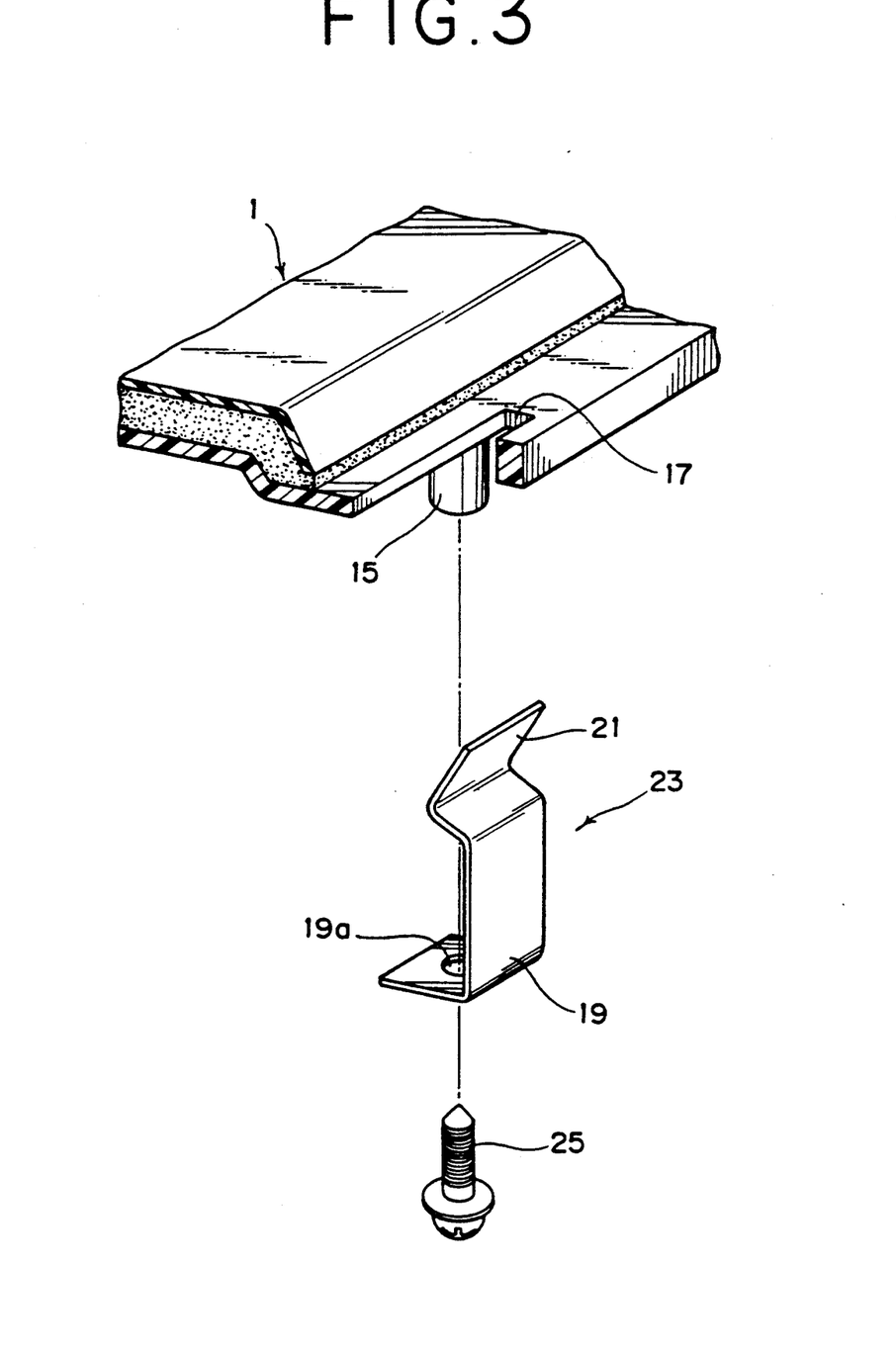
FIG. 3 is an exploded perspective view of a mounting structure according to the first preferred embodiment.

FIG. 1 shows the interior of a cabin of an automobile, in which reference numerals 1, 3,,and 5 designate an instrument panel, a front pillar trim, and a door trim, respectively. As shown in FIGS. 2 and 3, the instrument panel 1 is constructed by integrally molding a foam layer 11 between a skin member 7 and a base member 9.

The base member 9 is formed at its laterally opposite end portions with a pair of boss portions 15 (one of which being shown) projecting downwardly. Each of the boss portions 15 has a tapped hole 13. A slit 17 is formed through the base member 9 outside each boss portion 15.

Reference numeral 23 designates a leaf spring comprising an L-shaped base portion 19 and a biasing portion 21 extending upwardly from the base portion 19. The base portion 19 has a hole 19a through which a screw 25 is to be inserted. The biasing portion 21 is bent at its intermediate portion so as to bias the front pillar trim 3 inwardly of the cabin. The leaf spring 23 is fixedly mounted on the base member 9 of the instrument panel I by inserting the screw 25 through the hole 19a of the base portion 19 and threadedly engaging the screw 25 into the tapped hole 13 of the boss portion 15. The biasing portion 21 is inserted through the slit 17 and is located in opposed relationship to the skin member 7 at each lateral end portion of the instrument panel 1.

The front pillar trim 3 is mounted to a front pillar panel 27 of a vehicle body. A lower end portion of the front pillar trim 3 is located between the lateral end portion of the instrument panel-1 and the biasing portion 21 of the leaf spring 23. That is, the lower end portion of the front pillar trim 3 is resiliently held between the lateral end portion of the instrument panel 1 and the biasing portion 21 of the leaf spring 23 by a biasing force of the biasing portion 21 biasing the lower end portion of the front pillar trim 3 inwardly of the cabin (i.e., leftwardly as viewed in FIG. 2).

As mentioned above, according to the first preferred embodiment, the lower end portion of the front pillar trim 3 is biased inwardly of the cabin by the biasing portion 21 of the leaf spring 23, and is therefore resiliently held between the biasing portion 21 of the leaf spring 23 and the lateral end portion of the instrument panel 1. Accordingly, even when a manufacturing error in lateral dimension of the vehicle body becomes plus, the lower end portion of the front pillar trim 3 can be forcibly flexed inwardly of the cabin by the biasing portion 21 of the leaf spring 23, thereby offsetting the above manufacturing error. Thus, the lower end portion of the front pillar trim 3 can be always held between the lateral end portion of the instrument panel I and the biasing portion 21 of the leaf spring 23 irrespective of the manufacturing error, that is, can be maintained in contact with the lateral end portion of the instrument panel 1 to thereby eliminate a gap between the lateral end portion of the instrument panel I and the lower end portion of the front pillar trim 3, thus improving an appearance.

Figure 4:
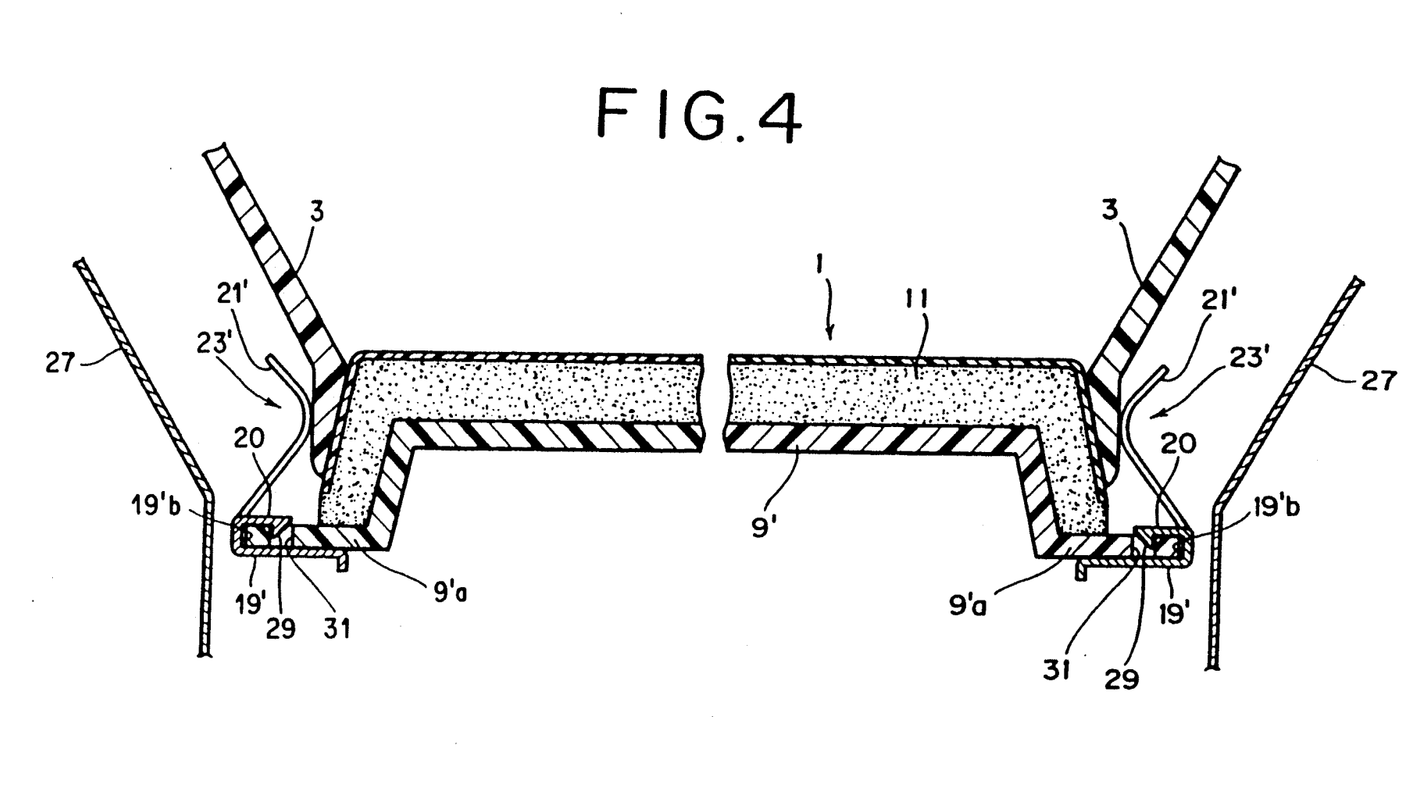
FIG. 4 is a sectional view similar to FIG. 2, showing a second preferred embodiment of the present invention.
Figure 5:
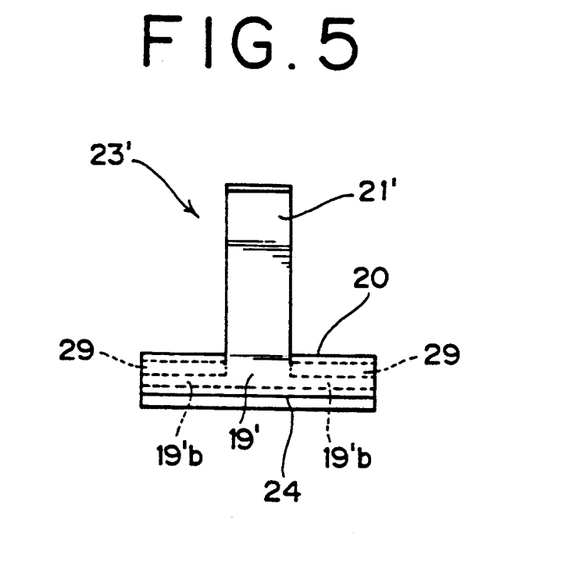
FIG. 5 is a rear elevation of a leaf spring employed in the second preferred embodiment.

Referring to FIGS. 4 and 5, there is shown a second preferred embodiment of the present invention. In the second preferred embodiment, a mounting structure of a leaf spring 23' to a base member 9' of the instrument panel 1 is different from that in the first preferred embodiment, and the other structure is the same as that in the first preferred embodiment. In the second preferred embodiment, the same parts as those in the first preferred embodiment are designated by the same reference numerals, and the detailed explanation thereof will be omitted. The leaf spring 23' is constituted of a base portion 19' and a biasing portion 21' extending upwardly from the base portion 19' at an intermediate portion thereof and integrally formed therewith. The base portion 19' is formed in U-shaped cross section to define a groove 19'b. Unlike the first preferred embodiment, the base member 9' of the instrument panel 1 is not formed with the boss portion 15 and the slit 17, but has a flat lateral end portion 9'a adapted to be engaged with the groove 19'b of the base portion 19' of the leaf spring 23'.

The U-shaped base portion 19' includes upper and lower plates 20 and 24 substantially parallel to each other. The upper plate 20 is formed with a pawl 29 projecting into the groove 19'b. On the other hand, the flat lateral end portion 9'a of the base member 9' is formed with a stopper hole 31 adapted to engage the pawl 29 of the upper plate 20 of the base portion 19' of the leaf spring 23', so as to prevent movement of the leaf spring 23' outwardly of the cabin. Thus, the leaf spring 23' is fixedly mounted to the base member 9' of the instrument panel 1 by engaging the base portion 19' of the leaf spring 23' with the flat lateral end portion 9'a of the base member 9'.

According to the second preferred embodiment, not only the same effect as that of the first preferred embodiment but also another effect such that the leaf spring 23' can be easily mounted to the instrument panel 1 can be achieved. That is, the leaf spring 23' can be mounted to the instrument pane 1 in a single operating manner only by engaging the base portion 19' of the leaf spring 23' with the flat lateral end portion 9'a of the base member 9' inwardly of the cabin. Accordingly, the number of mounting steps can be reduced. Furthermore, since the screw 25 as employed in the first preferred embodiment is not necessary, the number of parts can also be reduced.

Figure 6:
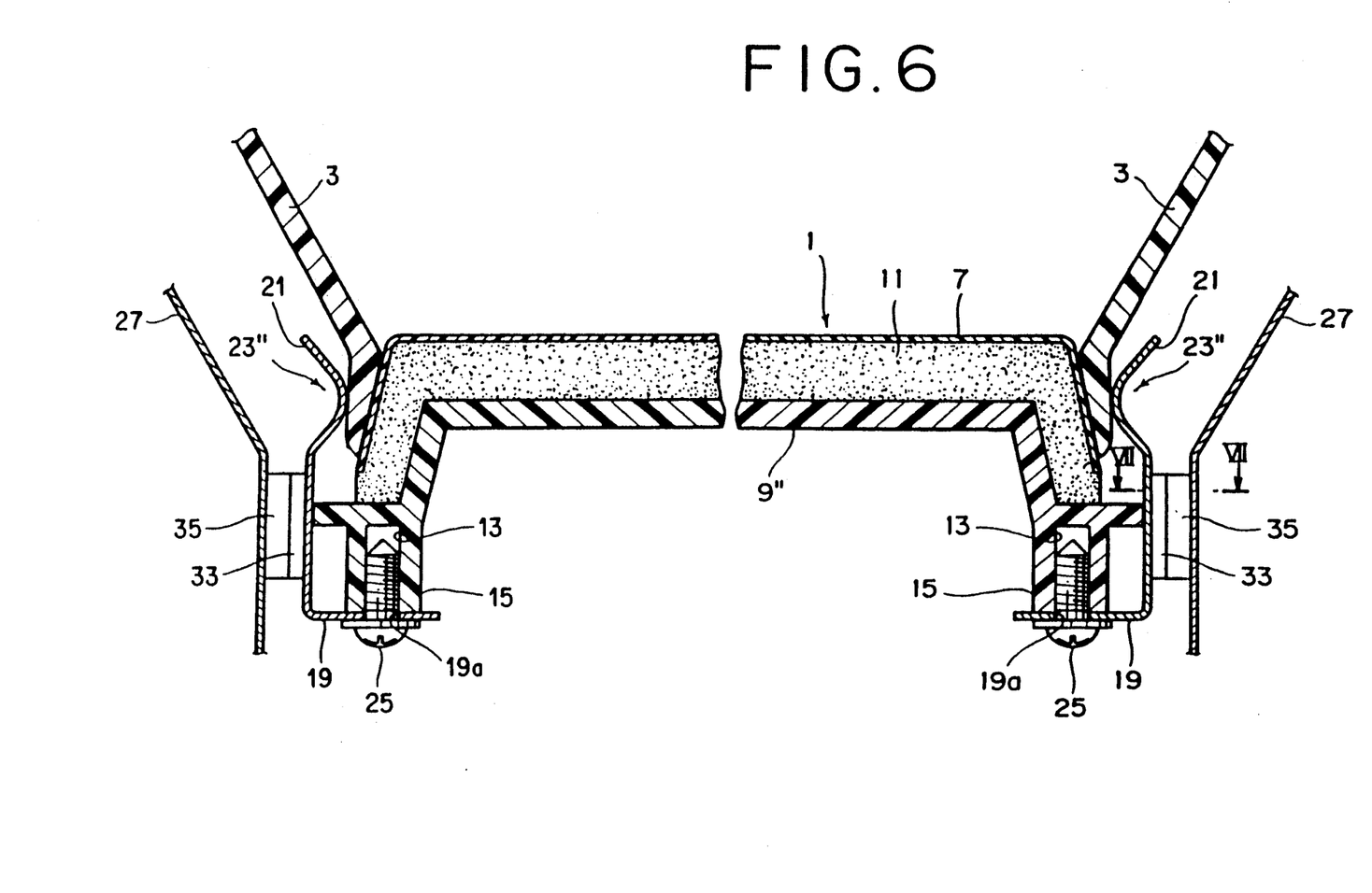
FIG. 6 is a sectional view similar to FIG. 2, showing a third preferred embodiment of the present invention.
Figure 7:
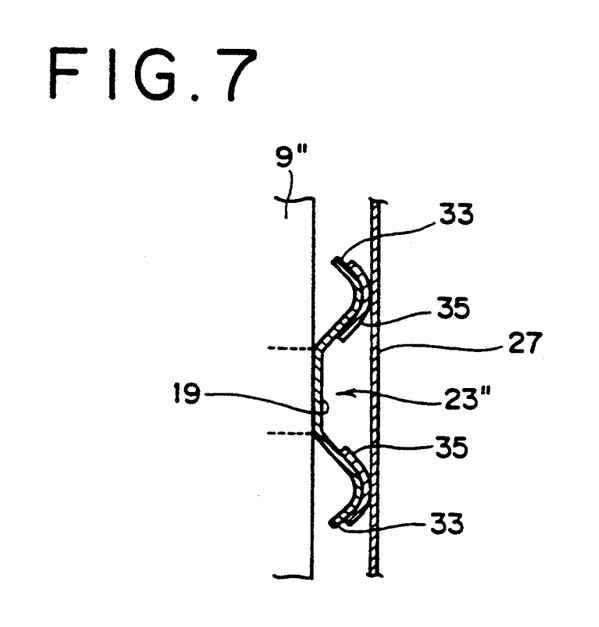
FIG. 7 is a cross section taken along the line VII—VII in FIG. 6.
Figure 8:
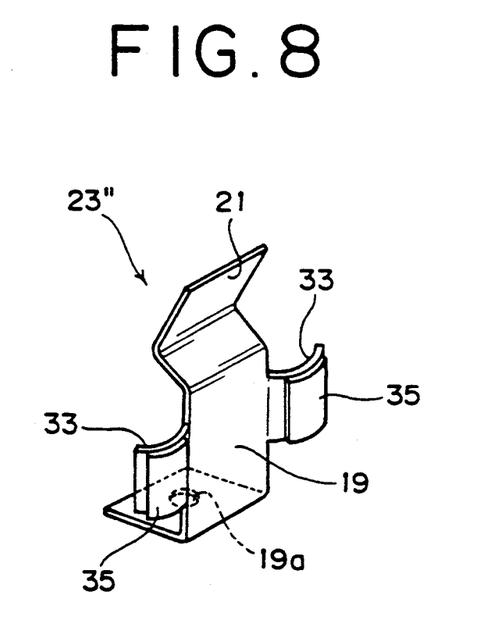
FIG. 8 is a perspective view of a leaf spring employed in the third preferred embodiment.

Referring to FIGS. 6 to 8, there is shown a third preferred embodiment of the present invention. In the third preferred embodiment, the instrument panel 1 has the same structure as that in the first preferred embodiment with the exception that the slit 17 is not formed, and the leaf spring 23 in the first preferred embodiment is modified to provide an additional biasing portion having an additional function (centering function) which will be hereinafter described in detail. The same parts as those in the first preferred embodiment are designated by the same reference numerals, and the detailed explanation thereof will be omitted. Reference numeral 23'' designates a leaf spring comprising an L-shaped base portion 19, a first biasing portion 21 extending upwardly from the base portion 19, and a pair of second biasing portions 33 extending symmetrically from opposite side edges of the base portion 19 (in front and rear directions of the vehicle body). Each of the second biasing portions 33 is bent at its intermediate portion to form a convex surface, on which a cushion member 35 such as a felt is attached to prevent separation of a coating film on the front pillar panel 27 or generation of noise due to contact of each second biasing portion 33 with the front pillar panel 27.

Similarly to the first preferred embodiment, the lower end portion of the front pillar trim 3 is biased inwardly of the cabin by the first biasing portion 21 of the leaf spring 23'' and is thereby resiliently held between the lateral end portion of the instrument panel I and the first biasing portion 21 of the leaf spring 23''. Further, the front pillar panel 27 is urged outwardly of the cabin by the second biasing portions 33 of the leaf spring 23''.

Thus, according to the third preferred embodiment, the lower end portion of the front pillar trim 3 is biased inwardly of the cabin by the first biasing portion 21 of the leaf spring 23'' and is resiliently held between the lateral end portion of the instrument panel 1 and the first biasing portion 21 of the leaf spring 23″, thereby attaining the same effect as that of the first preferred embodiment.

In addition, according to the third preferred embodiment, the front pillar panel 27 is urged outwardly of the cabin by the second biasing portions 33 of the leaf spring 23″. As a result, a reaction force from the front pillar panel 27 owing to a resilient force of the second biasing portions 33 is applied through the leaf spring 23″ to the instrument panel 1. Accordingly, the instrument panel 1 can be moved inwardly of the cabin, that is, can be centered by the counter reaction forces from the front pillar panel 27 and another front pillar panel (not shown). Thus, centering of the instrument panel 1 with respect to the vehicle body can be automatically effected.

Figure 9:
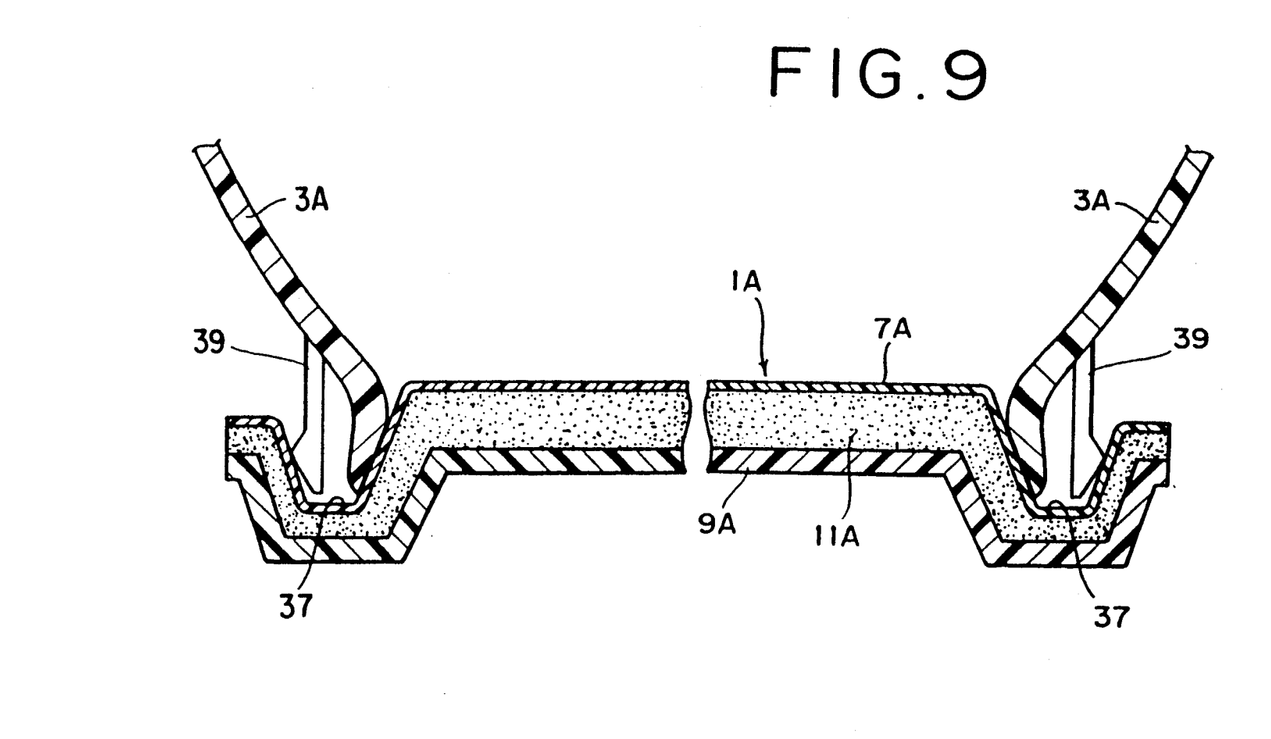
FIG. 9 is a sectional view similar to FIG. 2, showing a fourth preferred embodiment of the present invention.

Referring to FIG. 9, there is shown a fourth preferred embodiment of the present invention. In the fourth preferred embodiment, an instrument panel 1A comprises a skin member 7A, a base member 9A and a foam layer 11A as similar to the instrument panel 1 of the first preferred embodiment. The instrument panel 1A is formed at its lateral end portion with a recess 37 opening upwardly. On the other hand, a front pillar trim 3A similar to the front pillar trim 3 of the first preferred embodiment is integrally formed at its lower end portion with a pawl 39 adapted to be flexibly engaged with the recess 37. The front pillar trim 3A is mounted to the instrument panel 1A by press-fitting the lower end portion including the pawl 39 of the front pillar trim 3A as flexing the pawl 39 inwardly of the cabin into the recess 37 of the instrument panel 1A.

According to the fourth preferred embodiment, even when a manufacturing error in lateral dimension of the vehicle body becomes plus, the lower end portion of the front pillar trim 3A can be forcibly flexed inwardly of the cabin by the pawl 39 engaged in the recess 37, thereby eliminating a gap between the lateral end portion of the instrument panel 1A and the lower end portion of the front pillar trim 3A, thus improving an appearance.

Furthermore, according to the fourth preferred embodiment, the above effect can be achieved only by press-fitting the lower end portion of the front pillar trim 3A into the recess 37 of the instrument panel IA. Accordingly, the leaf spring as employed in the first to third preferred embodiments is not necessary, and the number of parts can therefore be reduced.

While the pawl 37 is formed at the lower end portion of the front pillar trim 3A, and the lower end portion is press-fitted into the recess 37 of the instrument panel 1A as flexing the pawl 37 in the fourth preferred embodiment, this means is merely illustrative and various modifications may be made according to the present invention. For instance, a spherically expanded portion may be formed at the lower end portion of the front pillar trim 3A, and the spherically extended portion may be press-fitted into the recess 37.

What is claimed is:

1. An instrument panel mounting structure for an automobile including a vehicle body having a pair of front pillar panels and a pair of front pillar trims mounted to said front pillar panels, respectively; said instrument panel mounting structure comprising:
an instrument panel mounted to said vehicle body; and
a pair of biasing means mounted to laterally opposite end portions of said instrument panel, respectively, for biasing lower end portions of said front pillar trims inwardly of a cabin of said automobile and urging said lower end portions of said front pillar trims against said laterally opposite end portions of said instrument panel.

2. The instrument panel mounting structure as defined in claim 1, wherein each of said biasing means comprises a leaf spring and a fastening member for fastening said leaf spring to said instrument panel;
said leaf spring comprising an L-shaped base portion having a hole and a biasing portion extending from one end of said L-shaped base portion; and
each of said laterally opposite end portions of said instrument panel being formed with a fastening hole adapted to receive a corresponding one of said fastening members and a slit through which a corresponding one of said biasing portions is adapted to be inserted;
whereby each said fastening member is inserted through a corresponding one of said holes of said L-shaped base portions and is engaged with a corresponding one of said fastening holes to thereby mount each said leaf spring to a corresponding one of said laterally opposite end portions of said instrument panel, and each of said lower end portions of said front pillar trim is urged by a corresponding one of said biasing portions of said leaf springs against a corresponding one of said laterally opposite end portions of said instrument panel.

3. The instrument panel mounting structure as defined in claim 1, wherein each of said biasing means comprises:
(i) a leaf spring having a base portion having a pair of substantially parallel plates defining a groove therebetween for receiving a corresponding one of said laterally opposive end portions of said instrument panel,
(ii) a pawl portion projecting from a corresponding one of said pair of substantially parallel plates into said grooves, and
(iii) a biasing portion integrally formed with a corresponding one of said base portions; and
each said laterally opposite end portion of said instrument panel being formed with a stopper hole adapted to engage a corresponding one of said pawl portions of said leaf springs;
whereby each said groove is engaged with a corresponding one of said laterally opposite end portions of said instrument panel to bring each said pawl portion into engagement with a corresponding one of said stopper holes, thereby mounting each said leaf spring to a corresponding one of said laterally opposite end portions of said instrument panel, and each of said lower end portions of said front pillar trims is urged by a corresponding one of said biasing portions of said leaf springs against a corresponding one of said laterally opposite end portions of said instrument panel.

4. The instrument panel mounting structure as defined in claim 1, wherein each of said biasing means comprises a leaf spring and a fastening member for fastening said leaf spring to said instrument panel;
each said leaf spring comprising:
(i) an L-shaped base portion having a hole, (ii) a first biasing portion extending from an end of a corresponding one of said L-shaped base portions, and
(iii) a second biasing portion extending from opposite side edges of said corresponding one of said L-shaped base portions; and each of said laterally opposite end portions of said instrument panel being formed with a fastening hole adapted to receive a corresponding one of said fastening members;

whereby each said fastening member is inserted through a corresponding one of said holes of said L-shaped base portions and is engaged with a corresponding one of said fastening holes to thereby mount each said leaf spring to a corresponding one of said laterally opposite end portions of said instrument panel; each of said lower end portions of said front pillar trims is urged by a corresponding one of said first biasing portions of said leaf springs against a corresponding one of said laterally opposite end portions of said instrument panel; and each said front pillar panel is urged by a corresponding one of said second biasing portions of said leaf springs outwardly of said cabin.

* * * * *